(12) United States Patent
Brunswig et al.

(10) Patent No.: US 8,234,308 B2
(45) Date of Patent: Jul. 31, 2012

(54) DELIVER APPLICATION SERVICES THROUGH BUSINESS OBJECT VIEWS

(75) Inventors: Frank Brunswig, Heidelberg (DE); Oswald Gschnitzer, Heidelberg (DE); Baré Said, St. Leon (DE); Jens Weiler, Weingarten (DE)

(73) Assignee: SAP AG, Walldorf (DE)

( * ) Notice: Subject to any disclaimer, the term of this patent is extended or adjusted under 35 U.S.C. 154(b) by 405 days.

(21) Appl. No.: 12/644,031

(22) Filed: Dec. 22, 2009

(65) Prior Publication Data

US 2011/0153505 A1    Jun. 23, 2011

(51) Int. Cl.
    *G06F 7/00*     (2006.01)
    *G06F 17/30*    (2006.01)
(52) U.S. Cl. ..................................... 707/793
(58) Field of Classification Search .............. None
    See application file for complete search history.

(56) References Cited

U.S. PATENT DOCUMENTS

| 7,720,803 | B2 * | 5/2010 | Unnebrink et al. ........... 707/601 |
| 2004/0210445 | A1 * | 10/2004 | Veronese et al. .................. 705/1 |
| 2007/0220046 | A1 * | 9/2007 | Moosmann et al. ....... 707/104.1 |
| 2010/0318974 | A1 * | 12/2010 | Hrastnik et al. .............. 717/135 |

* cited by examiner

*Primary Examiner* — Uyen T. Le

(57) ABSTRACT

Systems and methods for providing application services through business object views. In one aspect, a definition of at least one business object (BO) is included in a metadata of an application platform. The definition includes descriptions of entities of the BO, and an identification of a service provider of the BO. The service provider instantiates the business object in response to an application service request. In a further aspect, a definition of a business object view (BOV) is included in the metadata of the application platform. The definition includes description of entities of the BOV, and an identification of the BO. The BO is a data source of the BOV. In one other aspect, a transformation describes a mapping of BOV entities to data source BO entities. A service corresponding to a core service of a BOV entity is called at the BO service provider based on the mapping.

20 Claims, 8 Drawing Sheets

DELIVER APPLICATION SERVICES THROUGH BUSINESS OBJECT VIEWS

TECHNICAL FIELD

The field of the invention relates generally to data processing and digital processing systems. More specifically, the invention is related to providing services to consumers within a computer systems environment.

BACKGROUND

According to the information technology (IT) industry terminology, a business object (BO) could be defined as a uniquely identifiable business entity. In the context of a private computing environment, the existing business objects represent the entities in a business domain supported by one or more business applications. Business applications deliver application services to consumers based on the business objects. The business applications are traditionally implemented on top of application platforms that provide software basis for the different application services. The application platforms also provide a variety of infrastructure services, e.g., user interfaces, report generation, business object repositories, software logistics and lifecycle management, persistency abstraction, etc. Generally, the application platforms are developed and marketed by different software vendors. Proprietary application platforms are implemented in many private computing environments as well.

Often, application platforms, including the proprietary application platforms, are developed to provide business functionality that is applicable for small, medium, and large-sized business environments. Therefore, the business objects that are presented within an application platform need to correspond to the most complex business domain target group. The BOs existing in such universal application platforms contain more functionality than small and medium-sized companies really need. Part of the unnecessary functionality could be "hidden" behind adjustable business configuration or behind predefined user interfaces. However, the entire functionality of the application platform, including the whole complexity of the BOs, would be visible in various use-cases, especially in Flexibility and Extensibility scenarios, e.g., Ad hoc reporting, UI extensibility, etc. The task of limiting a consumer domain to access a narrower scope of the functionality presented by an application platform could require substantial resources, and could cause tradeoff in terms of performance and maintenance.

SUMMARY

Systems and methods for providing application services through business object views are described. In one aspect, a definition of at least one business object (BO) is included in a metadata of an application platform. The definition includes descriptions of a number of entities of the BO, and an identification of a service provider of the BO. The service provider instantiates the business object in response to an application service request. In a further aspect, a definition of a business object view (BOV) is included in the metadata of the application platform. The definition includes description of a number of entities of the BOV, and an identification of the BO. The BO is a data source or originator of the BOV. The BOV definition could specify more than one BO as a data source of the BOV. In one other aspect, a transformation is stored in the metadata of the application platform to describe mapping of the BOV entities to the entities of the BOs specified as data sources of the BOV. In yet another aspect, the definition of the BOV is loaded in the runtime environment of the application platform in response to a consumer call for a core service of a BOV entity. A service corresponding to the core service of the BOV entity is called at the BO service provider based on the mapping.

In an additional aspect, BOVs can be nested at design time, e.g., the BOV is defined on top of another BOV. In such a case, the BOV includes an identification of the underlying BOV instead of the identification of the BO. Nevertheless, at runtime, nested or hierarchal core service calls are avoided by calling directly the service of the BO corresponding to the consumer core service call. The direct call at runtime is made possible via an optimized mapping calculated at compile time and described in the transformation.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
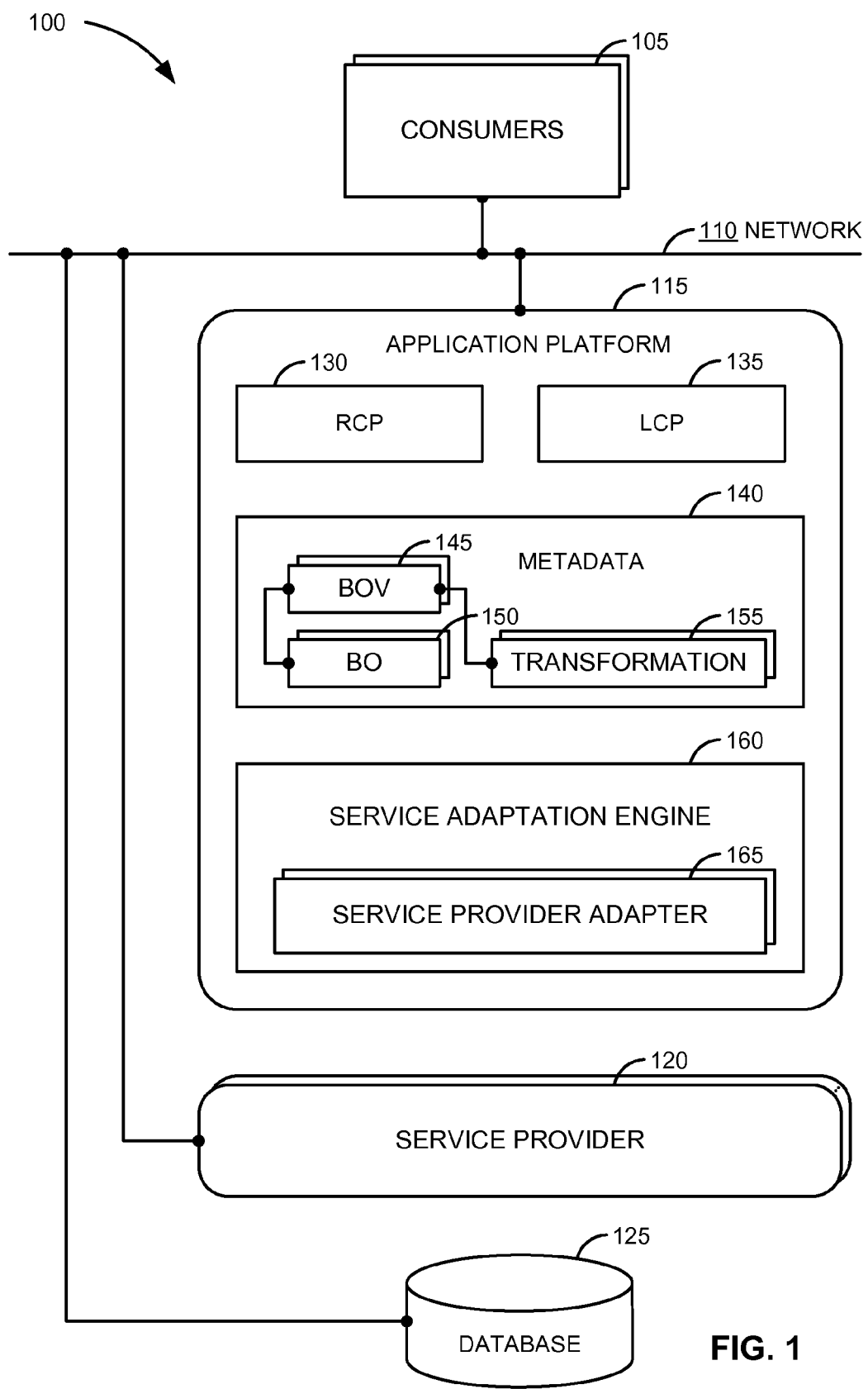
FIG. 1 is a block diagram of a computing environment for providing application services through business object views, according to one embodiment of the invention.

Embodiments of techniques for providing application services through business object views are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Broadly defined, a business object (BO) represents a well defined and outlined business content that encapsulates an independent business concept, recognized by the business world. Business objects can be categorized according to their business-related nature among other things. Some business objects might describe organizational units or structures for conducting business. Other BOs correspond to business transaction documents representing business transactions. In either case, BOs are characterized by their structure elements or entities. Table 1 represents an exemplar, non-exhaustive list of BO categories of entities:

TABLE 1

| BO entity category | Description |
| --- | --- |
| BO node | Represents a set of semantically related attributes of a business object, e.g. the BO "Sales Order" includes node "items" |
| Element | Representing a structure of a BO node |
| Association | Represents a semantic relationship between two BO nodes, where the nodes could belong to the same BO or to different BOs The association usually define unidirectional relationship where one BO node refers to another node, either of the same BO or of a different BO. |
| Composition | An association defining parent-child relationship between two nodes of the same BO |
| Query | Applicable to retrieve BO node identifiers and optionally data of the BO node elements if requested by the service consumer |
| Action | Usually assigned to a BO node to perform a predefined operation with one or more node elements |

A service is a resource that is able to perform a set of tasks, e.g., service operations, upon request by a consumer. Services are delivered by corresponding computer application instances within a computing environment. A core service is a service performing operations of a business object node. The set of all core services of a BO node completely encapsulates and controls the state of all node instances. Typically, the BOs of an application platform are modeled and implemented in a strictly normalized way, focused on service provisioning for complex business solutions. The normalized structure of the business objects ensures integrity and consistency of the allocated data and services, and avoids the redundancy. However, the normalized structures are not convenient for consumer access. Therefore, a special category of business object views is presented. A business object view (BOV) is modeled as a specific business object based on a core business object. Additional data and actions can be joined in the BOV from other business objects to achieve structural simplifications and easier consumption.

FIG. 1 is a block diagram of a computer environment 100 including consumers 105 accessing application services at application platform 115 via network 110. According to one embodiment of the invention, the services provided by application platform 115, e.g., backend services, are allocated by business objects 150 as defined in metadata 140, and executed by service providers 120. One or more business object views 145 are defined in metadata 140 on top of business objects 150. Each BOV 145 specifies underlying BO 150 as a main data source. The some of the entities of BOV 145 derive from corresponding entities of an underlying BO 150. Transformations 155 describe a mapping of entities of BOVs 145 to corresponding entities of BOs 150. The definitions of the BOVs 145 are available to the consumers 105 to access the allocated backend services.

Consumers 105 form a consumer domain that may include user interfaces, partner development tools or infrastructures, various third party analytic applications, forms, etc. Consumers 105 send method calls corresponding to different core services of the BOVs 145 through remote consumer proxy (RCP) 130. The RCP 130 maps the protocols used by the consumers 105 for the method calls, to the internal core service interfaces. The service calls received at RCP 130 are handled by service adaptation engine 160. The service adaptation engine 160 identifies the underlying BOs 150, and requests corresponding to the core services of the BOs 150 through service provider adapter 165 based on transformations 155.

The requested services are executed by the appropriate service providers 120. Service providers 120 could be different business applications. A service provider 120 may instantiate a service provider class corresponding to a business object 150 as defined in metadata 140. The instantiated service provider class creates an environment to perform the tasks associated with the requested service, e.g., extracts data, setup parameters, carries data persistency, etc. A service provider 120 may also act as a service consumer as data of different business objects 150 could be needed for executing the requested services. Such internal service calls from the service providers 120 are sent to application platform 115 through local consumer proxy (LCP) 135.

Both LCP 135 and RCP 130 implement metadata 140 to provide the service providers 120 and consumers 105, respectively, with access to the service interfaces of the BOVs 145. In general, BOVs 145 are developed to present a meta model of the required business functionality within computing environment 100, that is more convenient than the meta model presented by the normalized BOs 150. Database 125 could be used by application platform 115 to store metadata 140. In one embodiment of the invention, service adaptation engine 160 and service provider adapters 165 could create executable load based on the metadata 140, and store it database 125. Service providers 120 persist data associated with the respective BOs 150 in database 125.

Figure 2:
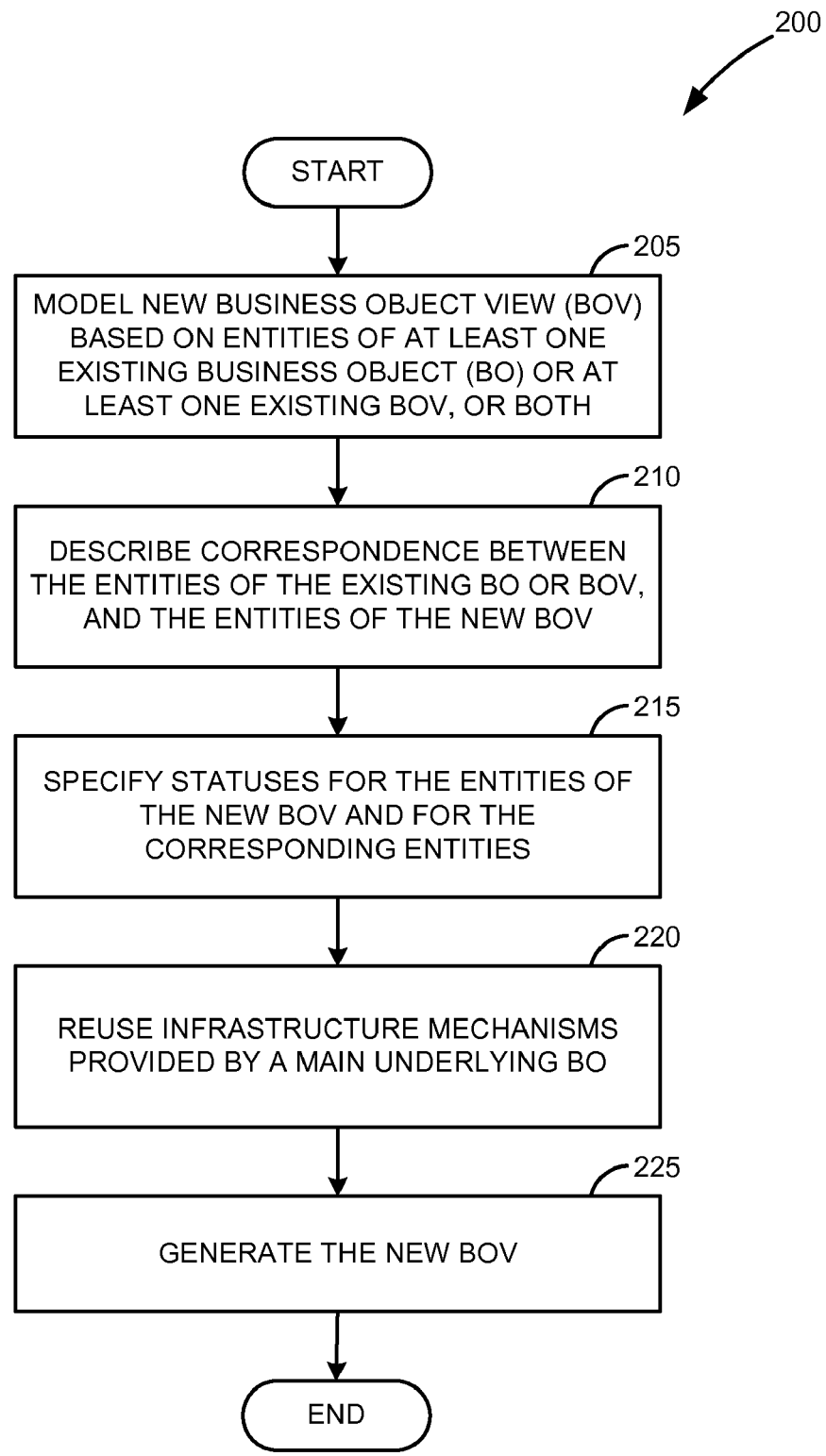
FIG. 2 illustrates a process for creating business object views in an application platform, according to one embodiment of the invention.

FIG. 2 shows a process 200 for creating business object views in an application platform based on existing business objects, according to one embodiment of the invention. At 205, a new business object view (BOV) is modeled based on the entities of at least one existing business object (BO). The new BOV could be also modeled based on the entities of at least one existing BOV, or based on the entities of at least one BO and at least one BOV. The meta model of the BOV could include de-normalized representation of the entities of a BO where the associated services are configured and adapted to fit to potential consumer needs. Thus, a frontend development of services adaptation and configuration at the consumer site could be minimized or completely avoided. Furthermore, the new BOV model could define entities that correspond to a subset of the entities of a BO. Thus, the consumer access could be limited to a meaningful subset of the functionality encapsulated within the existing BOs. The new BOV derivates from the one or more underlying BOs and BOVs.

Once the model of the new BOV is built, the correspondence between the entities of the existing BOs or BOVs and the entities of the new BOV is analyzed and described at 210.

An entity of the new BOV could map directly to an entity of an underlying BO or BOV. In such a case, the entity of the underlying BO or BOV "projects" all its properties into the entity of the new BOV. Alternatively, a transformation rule could be assigned to the mapping. The transformation rule could be described with a function having at least one parameter presenting an entity of an underlying BO or BOV. The function is calculated at runtime, and the result is mapped to the entity of the new BOV. For example, an entity of the new BOV could be mapped to a concatenation of an entity of an underlying BO and a substring of an entity of an underlying BOV. The direct or indirect mapping of an entity of the new BOV to an entity of an existing BO or BOV could be defined in the meta-model of the new BOV by a transformation including a mapping description, and a transformation rule when required.

In one embodiment of the invention, the nodes of a BOV can contain transformed elements which will be calculated at runtime. For such elements in the metadata repository a transformation (including transformation rule) shall be modeled to get a "where-used" index of the source BO elements which will be transformed by the calculation. For example, the "where-used" index is needed in an extensibility framework. The calculation itself is provided as a backend service adaptation function. The nodes of a business object view can contain associations, actions and queries that are directly or indirectly mapped to associations, actions and queries of underlying BOs. It is not possible to provide a service provider class to implement such associations, actions and queries.

Certain principles could be imposed regarding the mapping between different kinds of entities. For example, such principles may forbid associations from the new BOV to other BOs or BOVs. The navigation from a BOV to other BOs or BOVs must be based on real foreign key relationships. The reason for such limitation is to establish self-contained BOVs regarding the cross business object associations. Another rule regarding the association entities could ban generalized associations that are parameterized at runtime with specific filter, e.g., the scope of the generalized associations is defined at runtime. Further, it may not be allowed to use data objects directly in the BOVs, and the data objects have to be mapped through corresponding business objects that host the necessary data.

The mapping principles could impose a requirement that the properties of the BOV entities are restricted by the values of the properties of the corresponding entities of the underlying BOs or BOVs. For example, if an element of an underlying BO is "editable", then the mapped element in a derivative BOV can be "editable" or "read-only". Further, if an element of the underlying BO is "read-only", then the mapped element in the derivative BOV can only be "read-only".

The solution model built at the application platform includes complex and comprehensive business object structure. Some of the entities of this structure are for public use, and they could be accessed by consumers and integrated in, e.g., partner solutions. However, many of the entities of the business object structure are for internal use only, providing internal services. From consumer's perspective, these entities are not regarded as pertinent to the business solution model of the application platform. At 215, a status is assigned to the public entities of the new BOV to indicate that they could be accessed by the consumers. The entities of the underlying BOs or BOVs that correspond to the public entities of the new BOV could be marked with a status that indicates that they could no longer be accessed directly by the consumers.

In one embodiment of the invention, an important status associated to the public entities indicates the availability of a stability contract. The stability contract guarantees that an associated BOV entity is available, or will be available, in a particular software release of the application platform. The stability contract for an entity of the new BOV could be described by a release status code assigned to the entity. For example, the release status code could be set to "not released", "released with restrictions", "released", "deprecated" and "revoked". If an entity has release status code set to "released", it guarantees that the entity is included in the current software release, and will be included in at least the next software release of the application platform. The stability contracts guarantees the entities with release status code set to "released" or "deprecated" are fully supported by the current software release of the application platform, and respectively, all associated services are available to the consumers. Additionally, a label could be assigned to some or all of the entities of the new BOV. The labels could present descriptions of the corresponding entities that are aligned with the terminology of a specific business solution, and thus alleviate consumer's access to the relevant entities.

The new BOV derives directly or indirectly from one or more underlying BOs. The new BOV derives indirectly from a BO when it derives from a BOV which in turn derives directly or indirectly from the BO. For each BOV defined in an application platform, the underlying BO needs to be defined. BOVs reuse a number of infrastructure mechanisms that are provided by the underlying BOs. At 220, the new BOV is set to reuse infrastructure mechanisms provided by a main underlying BO. For example, the BOV needs to reuse a messaging mechanism of an underlying BO to provide error and information messages. Similarly, the authorization and the deployment mechanisms for the new BOV derives from the main underlying BO. Furthermore, the BOVs in an application platform may not be security relevant objects. Respectively, the access management services and BOV instances checks are delegated to corresponding frontend security objects and to the service providers of the underlying BOs, respectively.

The new BOV is generated at 225. According to one embodiment of the invention, the business object views are implemented within existing application platform architecture. For example, the definitions of the BOVs could be stored in a general metadata repository where the definitions of the BOs implemented within the application platform are kept. The service providers of the BOs could execute the core services associated with BOVs, respectively, no service providers for the BOVs are required. Consumer proxies and service adaptation engines could generate interfaces based on the BOVs' metadata to provide the consumers with access to the core services associated with the entities of the BOVs. The runtime environment of the BOVs could be presented by an existing service adaptation engine at the application platform. The metadata model of the new BOVs is compiled by a compiler, and a corresponding executable load is created and stored, e.g., in the metadata repository. The executable load is loaded by the service adaptation engine when a pertinent service call is received from a consumer.

Consumers, especially those including partner development tools and customer extensibility tools, display a solution business object layer during discovery. The solution business layer is provided by the application platform and includes the available business object view, that is, the BOVs containing public entities. If such business object views are not available, business objects will be used for discovery. All kind of partner and customer consumer domains, e.g., user interfaces, A2X services, reports, analytics, forms, etc., are based on the business object views if available. The comprehensive support for the business object views in the application platform, without any service provider and own-written coding, makes it possible to use a regular extensibility framework (EXF) for standard extensibility scenarios. A non-exhaustive exemplary list of use cases involving consumption of public BOVs could include:

Develop new BOs based on predefined BOs;
Develop new (alternative) UIs based on predefined BOs;
Generate new A2X services based on predefined BOs;
Develop new form message types based on predefined BOs (e.g., frontend printing);
Develop new Multi-Dimensional Analytical Views based on predefined BOs (e.g. via new Query definitions);
Develop new inbound service interfaces writing to a predefined BO (via new inbound process agents);
Develop new outbound service interfaces triggered from a predefined BO (via new outbound process agents).

Figure 3:
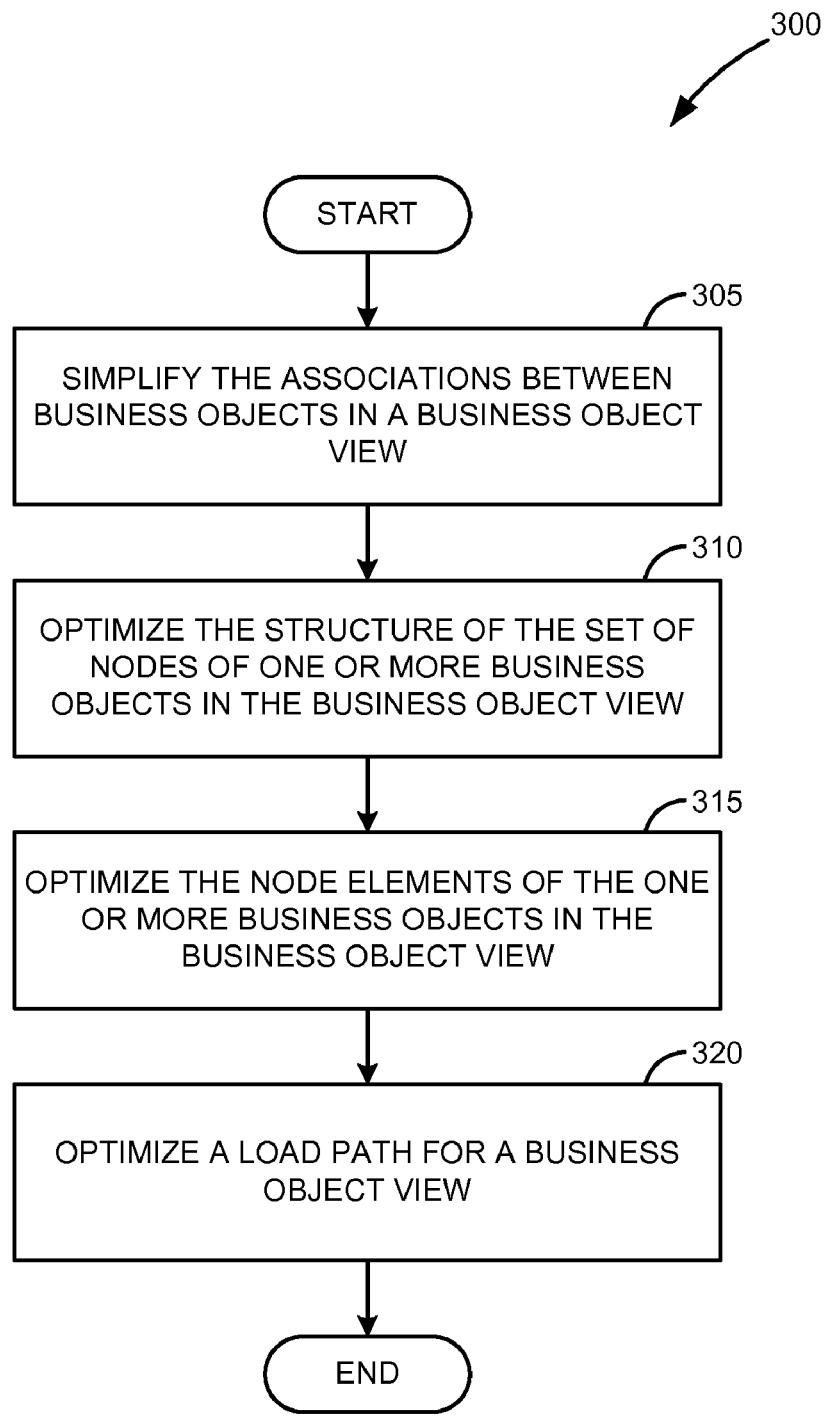
FIG. 3 illustrates a process for modeling optimized business object views, according to one embodiment of the invention.

The evaluation of how different consumer domains, e.g., user interface, analytics, etc., use normalized and complex business objects reveals similar simplification patterns that are used for building content in these domains. The simplification may affect the set of business object nodes or the structure elements of the business object nodes. Business object views could be modeled based on the assumptions related with simplification patterns applied by the consumers, and further based on the constraints imposed to the business object views compared to the business objects. FIG. 3 shows a process 300 for modeling optimized business object views based on different simplification approaches, according to one embodiment of the invention.

Process 300 starts at 305 with simplifying the associations between different business objects in a business object view. The normalized layout of the business objects in the application platform could produce a rather complex structure of associations between the nodes of the different BOs. One of the possible ways to simplify this association structure is to create a business object view based on a number of involved business objects. The node entities of the created BOV are mapped to nodes and node transformations from the different BOs, wherein the node transformations could be based on the existing associations between the BOs. The modeled BOV is self contained, e.g., no associations with other BOs or BOVs should be included. The de-normalized structure of the modeled BOV includes additional nodes or node elements that may contain duplicated information, but avoid complex associations between the nodes. For example, an association between two nodes in two BOs could be resolved in the BOV by adding the referred BO node as an element to a BOV node mapped to the referring BO node.

At 310, an optimization of the structure of the set of nodes of one or more BOs or BOVs that are included in a BOV is performed following a common simplification pattern. For example, the reduction of the number of nodes leads to structures which are easier to consume by most consumer tools. A cardinality property defines how often a node is to be instantiated at runtime, e.g., how many elements of this node are available at runtime. Typically, a node with a "1:C" cardinality (C=0 or 1—up to one element for the node is instantiated) is handled like a deep table structure by the consuming tools, even though it does not behave as a deep structure. Therefore, having fewer nodes with more elements (fields) is better from a consumption perspective than more nodes with fewer elements. The nodes with "1:C" cardinality could be merged or joined to a parent node. Alternatively, in a BO node with a table of entries, each entry has an associated code value, and for each code value exactly one entry is allowed. In the modeled BO a flat structure is created by introducing an element per code value in a parent BO node.

At 315, an optimization of the node elements of the one or more BOs or BOVs that are included in the BOV is performed. The elements of a node define the node's structure. Consumers may not need to access to certain node elements of a BO or BOV. Respectively, the unnecessary node elements will not be included in the modeled BOV. In general, the modeled BOV should include only entities that are meaningful to the potential consumers. Another approach to optimize node elements in a BOV model is by reusable special transformations. For example, an element of a BOV node could result from an associated transformation function having elements from one or more corresponding nodes as parameters. Further, additional elements to alleviate the consumption of the modeled BOV could be presented, e.g., for each foreign key to a master data BO at least one human readable text field could be made available.

The modeled BOV could derive from one or more previously defined BOVs thus forming layers of BOVs on different levels of interdependency. At runtime, the layering could result in an inefficient service provisioning characterized by nested service calls and redundant load of executable BOV definitions. At 320, the load path for the modeled BOV is optimized.

Figure 4:
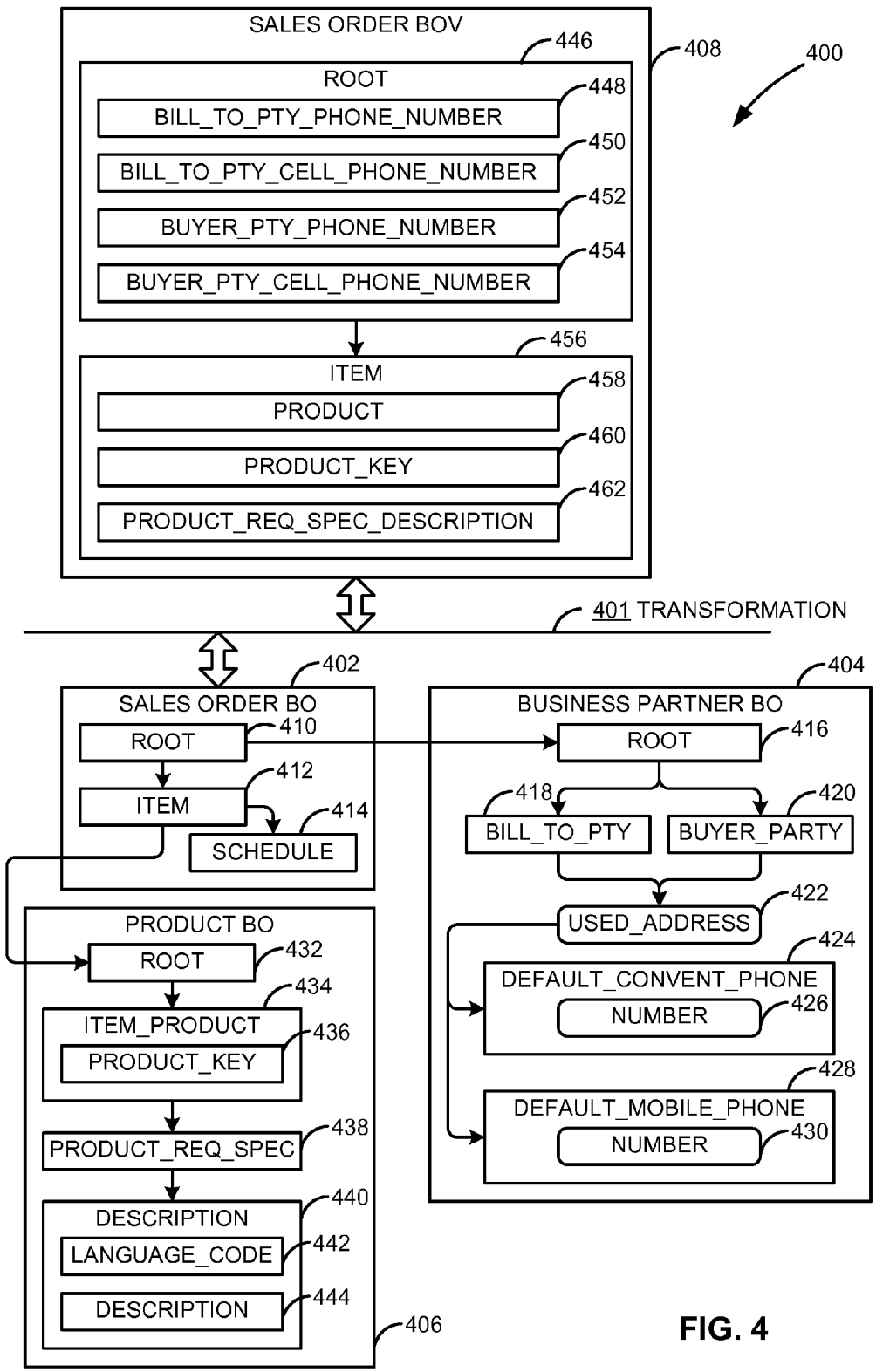
FIG. 4 is a block diagram of a business model including business object view, according to one embodiment of the invention.

FIG. 4 is a block diagram of a business model 400 that illustrates optimizations of a set of nodes structure and of node elements, according to one embodiment of the invention. Business model 400 includes sales order BO 402, business partner BO 404 and product BO 406. Sales order BOV 408 derives from sales order BO 402. Transformation 401 describes the mapping of the entities of the sales order BOV 408 to the corresponding entities of the respective business objects. Sales order BO 402 includes root node 410, item node 412 and schedule node 414. Root node 410 is associated to item node 412, e.g., each instance of root node 410 includes a reference to at least one instance of item node 412. Similarly, item node 412 is associated with schedule node 414 to define that for each instance of item node 412, an instance of schedule node 414 could be provided. The existing associations between the nodes of a BO or BOV, or the associations between nodes across BOs are illustrated with arrows in FIG. 4.

The root node 410 of sales order BO 402 is also associated with root node 416 of business partner BO 404. Business partner BO 404 also includes bill_to_pty node 418, buyer_party node 420, used_address node 422, default_convent_phone node 424 and default_mobile_phone node 428. The default_convent_phone node 424 includes number element 426, and default_mobile_phone node 428 includes number element 430. Further, the root node 410 of sales order BO 402 is associated with root node 432 of product BO 406. Product BO 406 also includes item_product node 434 with product_key element 436, product_req_spec node 438, and description node 440 with language_code element 442 and description element 444.

Sales order BOV 408 includes root node 446 with bill_to_pty_phone number element 448, bill_to_pty_cell_phone_number element 450, buyer_pty_phone_number element 452 and buyer_pty_cell_phone_number element 454. Sales order BOV 408 also includes item node 456 with product element 458, product_key element 460 and product_req_spec_description element 462.

Multiple nodes with "1:C" cardinality from the business objects in an application platform could be joined using appropriate mapping by following an association from a referring node to the referred nodes of "1:C" cardinality. Table 2 illustrates an example snippet of service adaptation description language (SADL) code that merges nodes with cardinality "1:C" default_convent_phone node 424 and default_mobile_phone node 428 of business partner BO 404 to root node 446 of sales order BOV 408:

TABLE 2

Merge nodes with cardinality "1:C"

```
<sadl:dataSource binding="SALES_ORDER/ass:ROOT" name="DS"
type="BusinessObjectNode"/>
<sadl:resultSet>
    <sadl:structure dataSource="DS" maxEditMode="EX"
    name="ROOT">
        <sadl:attribute
        binding="ass:BILL_TO_PARTY/ass:USED_ADDRESS/
                ass:DEFAULT_CONVENT_PHONE/NUMBER"
            name="BILL_TO_PTY_PHONE_NUMBER"/>
        <sadl:attribute
        binding="ass:BILL_TO_PARTY/ass:USED_ADDRESS/
                ass:DEFAULT_MOBILE_PHONE/NUMBER"
            name="BILL_TO_PTY_CELL_PHONE_NUMBER"/>
        <sadl:attribute binding="ass:
        BUYER_PARTY/ass:USED_ADDRESS/
                ass:DEFAULT_CONVENT_PHONE/NUMBER"
            name="BUYER_PTY_PHONE_NUMBER"/>
        <sadl:attribute binding="ass:
        BUYER_PARTY/ass:USED_ADDRESS/
                ass:DEFAULT_MOBILE_PHONE/NUMBER"
            name="BUYER_PTY_CELL_PHONE_NUMBER"/>
    </sadl:structure>
</sadl:resultSet>
```

Regarding the optimizations of node elements, Table 3 illustrates an example snippet of SADL code representing a mapping function providing reusable special transformation. The function is assigned to item node 412 of sales order BO 402, and concatenates product_key element 436 of item_product node 434 with description element 444 of description node 440 of product BO 406 in product element 458 in sales order BOV 408:

TABLE 3

Provide reusable special transformations

```
<sadl:structure binding="ass:ITEM" maxEditMode="ED"
name="ITEM">
    <sadl:attribute binding="
    func:CONCATENATGE(ass:ITEM_PRODUCT/PRODUCT_KEY, '-',
            ass:ITEM_PRODUCT/ass:PRODUCT_REQ_SPEC/
            ass:DESCRIPTION[LANGUAGE_CODE=SY-
LANGU]/DESCRIPTION)
        NAME="PRODUCT" />
```

Further, a node element could be optimized by enriching it with relevant texts in the modeled BOVs. The vast majority of the consumers (user interfaces, forms, analytics, etc.) need a human readable text for data identification to efficiently access the available business functionality. In many cases, the human readable text should be language dependant, and only the text in the logon language of a user could be loaded. Table 4 illustrates an example snippet of SADL code for enriching item node 456 of sales order BOV 408 with product_req_spec_description element 462 containing read-only texts in the logon language:

TABLE 4

Enrich with texts for reading

```
<sadl:structure binding="ass:ITEM" maxEditMode="ED"
name="ITEM">
    <sadl:attribute binding="ass:ITEM_PRODUCT/PRODUCT_KEY"
        maxEditMode="ED"
            name="PRODUCT_KEY"/>
    <sadl:attribute
    binding="ass:ITEM_PRODUCT/ass:PRODUCT_REQ_SPEC/
            ass:DESCRIPTION[LANGUAGE_CODE=SY-
LANGU]/DESCRIPTION"
        maxEditMode="RO"
            name="PRODUCT_REQ_SPEC_DESCRIPTION"/>
</sadl:structure>
```

Figure 5:
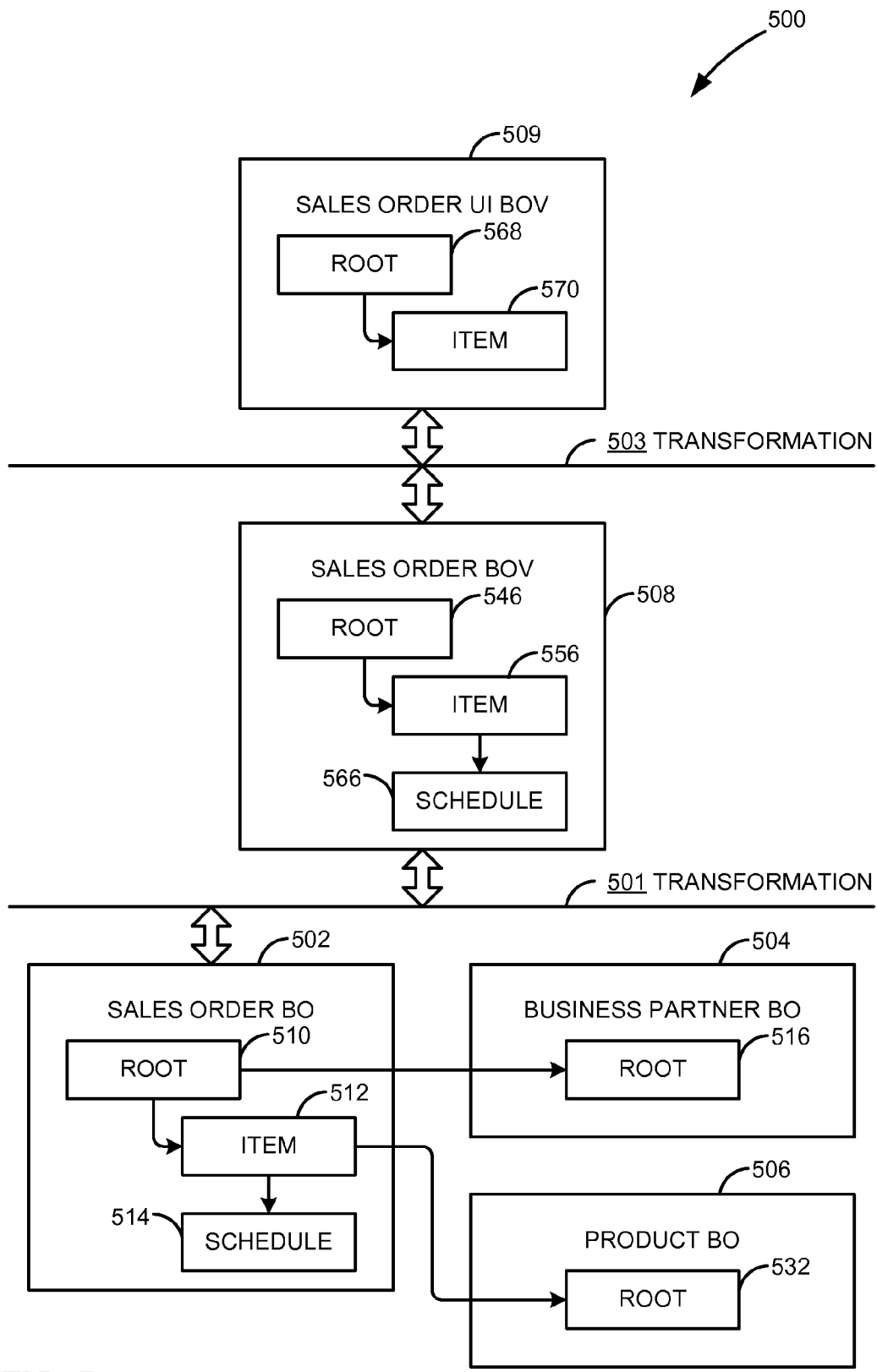
FIG. 5 is a block diagram of a business model including layered business object views, according to one embodiment of the invention.
Figure 6:
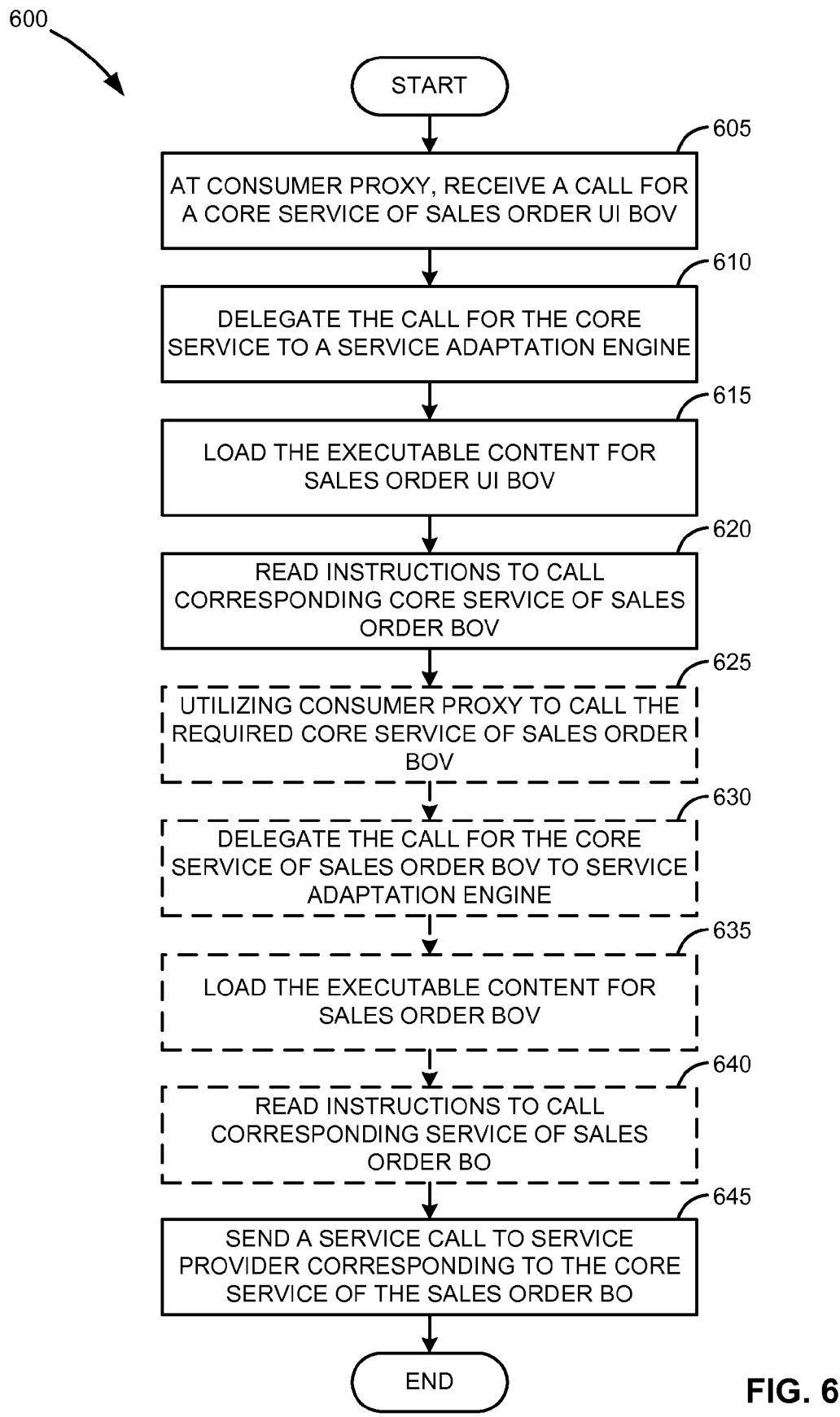
FIG. 6 illustrates a process for processing a consumer call for a core service at an application platform, according to one embodiment of the invention.
Figure 7:
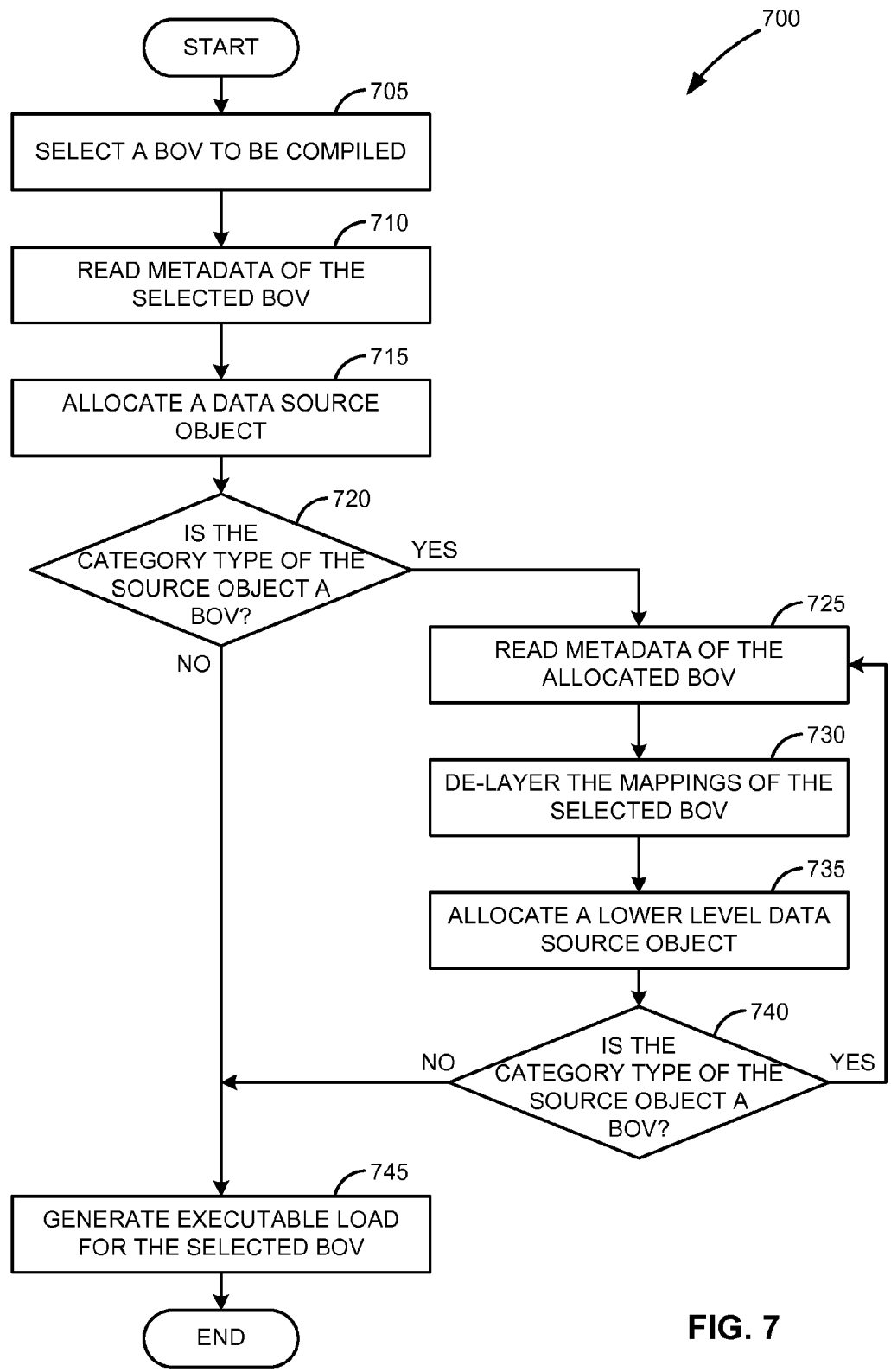
FIG. 7 illustrates a process for optimizing the loading path of layered business object views, according to one embodiment of the invention.

The optimization of a load path for a business object view is illustrated with FIG. 5, FIG. 6 and FIG. 7. FIG. 5 is a block diagram of a business model 500 that illustrates levels of business object views, according to one embodiment of the invention. Business model 500 includes sales order BO 502, business partner BO 504 and product BO 506. Sales order BOV 508 derives from sales order BO 502. Transformation 501 describes the mapping of the entities of the sales order BOV 508 to the corresponding entities of the respective business objects. Sales order UI BOV 509 derives from sales order BOV 508. Transformation 503 describes the mapping of the entities of the sales order UI BOV 509 to the corresponding entities of sales order BOV 508.

Sales order BO 502 includes root node 510, item node 512 and schedule node 514. Root node 512 is associated to item node 512, e.g., each instance of root node 510 includes a reference to at least one instance of item node 512. Similarly, item node 512 is associated with schedule node 514 to define that for each instance of item node 512, an instance of schedule node 514 could be provided. The root node 510 of sales order BO 502 is also associated with root node 516 of business partner BO 504. Further, the item node 512 of sales order BO 502 is associated to root node 532 of product BO 506. The existing associations between the nodes of a BO or BOV, or the associations between nodes across BOs are illustrated with arrows in FIG. 5. Sales order BOV 508 includes root node 546, item node 556 and schedule node 566. Sales order UI BOV 509 includes root node 568 and item node 570.

FIG. 6 shows an exemplary process 600 for processing a consumer call for a core service at an application platform, according to one embodiment of the invention. The process 600 is illustrated in the context of business model 500 of FIG. 5 for easier understanding. At 605, a consumer call for a core service of the sales order UI BOV 509 is received at a consumer proxy in the application platform implementing the business model 500. The consumer call for the core service is delegated to a service adaptation engine of the application platform at 610. The service adaptation engine loads the executable content for the sales order UI BOV 509 at 615. The executable content (or load) of a BOV is created at the application platform by a compiler during the generation of the BOV, and is usually stored in the same metadata repository where the model definitions of the BOV are stored.

The load contains the mapping of the entities of the sales order UI BOV 509 to the corresponding entities of the sales order BOV 508. Respectively, the requested core service of the sales order UI BOV 509 is provided by a corresponding core service of the sales order BOV 508. At 620, service adaptation engine reads the instructions of the loaded executable content to call the corresponding core service of sales order BOV 508. The application platform utilizes consumer proxy to generate the call to the required core service of the sales order BOV 508 at 625. At 630, the consumer proxy again delegates the call for the core service to service adaptation engine. The service adaptation engine loads the executable content for the sales order BOV 508 at 635.

The load for the sales order BOV 508 contains the mapping of the entities of the sales order BOV 508 to the entities of the sales order BO 502. Respectively, the requested core service of the sales order BOV 508 is provided by a corresponding service of the sales order BO 502. At 640, service adaptation engine reads the instructions of the loaded executable content of the sales order BOV 508 to call the corresponding service of sales order BO 502. At 645, service adaptation engine sends a service call corresponding to the core service of the sales order BOV 508, and respectively corresponding to the sales order UI BOV 509. The service call is sent to a service provider associated with the sales order BO 502 via a service provider adapter.

Process 600 could be optimized by excluding the actions associated with blocks 625 to 640. This optimization of the process 600 will be possible if the executable load of the sales order UI BOV 509 contains instructions to send a service call corresponding to the core service directly to the service provider of the sales order BO, without loading executable content for sales order BOV 508.

Generally, a business model implemented in an application service could contain many levels of BOVs. The BOVs on one level directly derive from the BOVs on the previous level. The BOVs on the first level derive from the existing BOs. The load path optimization for a business object view that does not derive directly from a business object could be accomplished by modifying the mapping metadata during the compilation of the business object view. The compiler that is running on the application platform has access to the definitions, e.g., to the metadata, of all BOs and BOVs presented in the application platform. Respectively, the compiler could trace the mapping of every entity of a BOV to one or more entities of any underlying BOV or BO. Compiler optimizes the loading path of a BOV by generating runtime mapping between the entities of the BOV to the corresponding entities of the underlying one or more BOs. This optimization is also called de-layering of the loading path of a BOV.

FIG. 7 shows a process 700 for optimizing the loading path of layered business object views. According to one embodiment of the invention, in the definitions of the BOs and the BOVs in the application platform category type indicators showing whether an object is a business object or a business object view are included. At 705, a BOV to be compiled is selected. The definition or the metadata of the selected BOV could be persisted in metadata repository. At 710, the metadata of the selected BOV is read by a compiler. At 715, a data source object for the selected BOV is allocated. The selected BOV derives directly from the data source object.

At 720, a check is performed to verify whether the category type of the data source object indicates a business object view. If the data source of the selected BOV to be compiled is a BOV, at 725, compiler reads the metadata of the allocated data source BOV. The mappings of the entities of the selected BOV to the entities of the allocated data source BOV are updated with the metadata of the allocated BOV at 730.

The process of updating the mappings of the selected BOV is also called de-layering. For example, as shown in FIG. 5, the complete not optimized SADL mapping for the item node 570 of sales order UI BOV 509 is:

Sales Order UI Controller/ass:Items=>Sales Order View/ ass:Items=>Sales

Order/ass:Items

Sales order BOV 508 has category type "Business object view", respectively the mapping of the item node 570 of sales order UI BOV 509 can be optimized, e.g., de-layered, just by removing the part related to the Sales order BOV 508:

Sales Order UI Controller/ass:Items=>Sales Order/ass: Items

At 735, a data source object of the data source BOV is allocated, e.g., a data source object on a lower level for the selected BOV is allocated. At 740, a check is performed to verify whether the category type of the allocated data source object on a lower level indicates a business object view. If the allocated data source object on a lower level is a BOV, process 700 repeats the actions presented by blocks 725 through 740. If either of the checks at 720 or at 740 shows that the data source object category type does not indicate a business object view, process 700 continues at 745 where the compiler generates the executable content, e.g., the load, for the selected BOV.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 8:
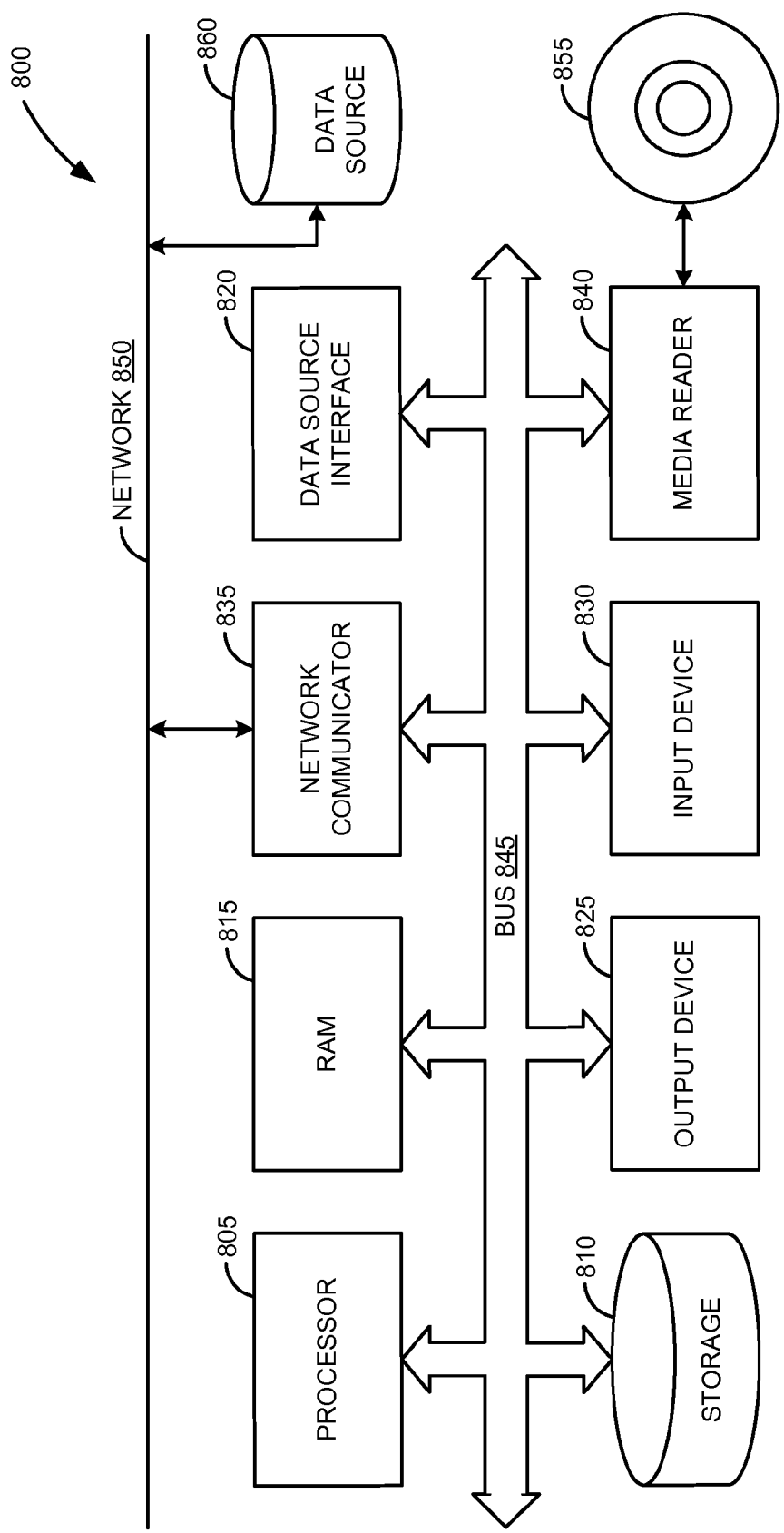
FIG. 8 is a block diagram of an exemplary computer system for providing application services through business object views, according to one embodiment of the invention.

FIG. 8 is a block diagram of an exemplary computer system 800. The computer system 800 includes a processor 805 that executes software instructions or code stored on a computer readable medium 855 to perform the above-illustrated methods of the invention. The computer system 800 includes a media reader 840 to read the instructions from the computer readable medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment of the invention, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be access via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, provides calculations associated with the underlying data.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer system for providing application services through business object views, the system comprising:
   a metadata repository coupled to the processor including:
      a definition of a business object (BO) including a description of a BO entity and an identification of a service provider of the BO,
      a definition of a business object view (BOV) including a description of a BOV entity and an identification of the BO as a data source for the BOV, and
      a transformation to describe a mapping of the BOV entity to the BO entity;
   a processor; and
   a memory coupled to the processor including a plurality of instructions, which when executed from the memory, cause the processor to
      load the BOV definition in response to a consumer call for a core service of the BOV entity, and
      send a service call to the service provider of the BO based on the mapping of the BOV entity to the BO entity, wherein the service call to the service provider corresponds to the consumer call for the core service of the BOV entity.

2. The system of claim 1, wherein the transformation comprises:
a transformation rule including a function with at least one parameter to define a projection of the BO entity to the BOV entity.

3. The system of claim 1, wherein the metadata repository comprises:
a status for the BOV entity, wherein the status indicates that the BOV entity is available to a consumer; and
a status for the BO entity, wherein the status indicates that the BO entity is not available to the consumer based on the described mapping of the BOV entity to the BO entity.

4. The system of claim 1, wherein the metadata repository comprises:
a definition of a second BO including a description of a second BO entity;
an association between the BO and the second BO entity; and
a definition of a foreign key relationship between the BOV entity and the second BO entity, wherein the foreign key relationship corresponds to the association of the BO entity to the second BO entity.

5. The system of claim 1 further comprising:
a definition of at least one derivative BOV including a description of a derivative BOV entity and an identification of the BOV as a data source of the derivative BOV;
a derivative transformation to describe a mapping of the derivative BOV entity to the BOV entity; and
a plurality of instructions, which when executed from the memory, cause the processor to
load the derivative BOV definition in response to a consumer call for a core service of the derivative BOV entity,
load the BOV definition based on the described mapping of the derivative BOV entity to the BOV entity, and
send a service call to the service provider of the BO based on the described mapping of the BOV entity to the BO entity, wherein the service call to the service provider corresponds to the consumer call for the core service of the derivative BOV entity.

6. The system of claim 5 further comprising:
an optimized mapping of the derivative BOV entity to the BO entity; and
a plurality of instructions, which when executed from the memory, cause the processor to
load the derivative BOV definition in response to the consumer call for a core service of the derivative BOV entity, and
send a service call to the service provider of the BO based on the optimized mapping of the derivative BOV entity to the BO entity, wherein the service call to the service provider corresponds to the consumer call for the core service of the derivative BOV entity.

7. An article of manufacture comprising computer readable instructions stored thereon which when executed by a processor cause a computer environment to:
load a definition of a business object view (BOV) in response to a consumer call for a core service of an entity of the BOV, wherein the BOV entity is described in the BOV definition;
identify a business object (BO) based on the BOV definition, wherein the BO is a data source of the BOV;
in the BOV definition, read a transformation describing a mapping of the BOV entity to an entity of the BO;
identify a service provider of the BO based on a definition of the BO; and
send a service call to the service provider of the BO based on the mapping of the BOV entity to the BO entity, wherein the service call to the service provider corresponds to the consumer call for the core service of the BOV entity.

8. The article of manufacture of claim 7 further comprising computer readable instructions which when executed by the processor cause the computer environment to:
load a definition of a derivative BOV in response to a consumer call for a core service of an entity of the derivative BOV, wherein the derivative BOV entity is described in the derivative BOV definition, and wherein the derivative BOV definition includes an identification of the BOV as a data source of the derivative BOV;
in the derivative BOV definition, read an optimized transformation describing an optimized mapping of the derivative BOV entity directly to an entity of the BO; and
send a service call to the service provider of the BO based on the optimized mapping of the derivative BOV entity to the BO entity, wherein the service call to the service provider corresponds to the consumer call for the core service of the derivative BOV entity.

9. A computerized method for providing application services through business object views, the method comprising:
at a computer system, receiving a consumer call for a core service of an entity of a business object view (BOV);
loading a definition of the BOV in an operative memory of the computer system in response to the consumer call, the definition including a description of the BOV entity;
identifying a business object (BO) and an entity of the BO, wherein the BOV derivate directly or indirectly from the BO, and wherein the BOV entity maps directly or indirectly to the BO entity; and
sending a service call to a service provider of the BO based on a mapping of the BOV entity to the BO entity, wherein the service call to the service provider corresponds to the consumer call for the core service of the BOV entity.

10. The method of claim 9 further comprising:
assigning a status to the BOV entity, wherein the status indicates that the core service of the BOV entity is available for consumption.

11. The method of claim 9 further comprising:
assigning a second status to the BOV entity, the second status indicates that the core service of the BOV entity is available for consumption for a fixed or relative period of time.

12. The method of claim 9 further comprising:
identifying an underlying BOV based on the BOV definition, wherein the underlying BOV is a data source of the BOV;
loading in the operative memory of the computer system a definition of the underlying BOV in response to the consumer call for the core service of the BOV entity, wherein the underlying BOV definition includes a description of an entity of the underlying BOV that allocates a core service;
in the BOV definition, reading a first transformation describing a mapping of the BOV entity to the underlying BOV entity;
in the underlying BOV definition, reading a second transformation describing a mapping of the underlying BOV entity to the BO entity; and
sending a call for the core service of the underlying BOV entity based on the mapping of the BOV entity to the underlying BOV entity, wherein the call for the core service of the underlying BOV entity corresponds to the consumer call for the core service of the BOV entity.

13. The method of claim 9 further comprising:
identifying an underlying BOV based on the BOV definition, wherein the underlying BOV is a data source of the BOV; and
in the BOV definition, reading an optimized transformation describing an optimized mapping of the BOV entity directly to the BO entity.

14. The method of claim 9, wherein receiving the consumer call comprises:
presenting an application interface corresponding to the BOV core service, wherein the application interface provides a method to invoke the core service.

15. The method of claim 9, wherein receiving the consumer call comprises:
exposing a discovery layer based on the business object view; wherein the discovery layer provides a description of the core service.

16. The method of claim 9, wherein loading the definition of the BOV comprises:
compiling the definition of the BOV to an executable version including a plurality of processor instructions; and
storing the executable version of the BOV definition.

17. The method of claim 9, wherein loading the definition of the BOV comprises:
reading the executable version of the BOV definition in the operative memory of the computer system from a storage.

18. The method of claim 9, wherein loading the definitions of the BOV comprises:
loading the mapping of the BOV entity to the BO entity in the operative memory of the computer system as part of a runtime environment.

19. The method of claim 9, wherein identifying the business object comprises:
in the operative memory of the computer system, reading a category type associated to an object, wherein the category type indicates whether the object is a business object or a business object view.

20. The method of claim 19 further comprising:
referring to the category type associated to an object to optimize the mapping of the BOV entity to the BO entity by excluding references to at least one underlying BOV.

* * * * *